United States Patent [11] 3,627,832

[72] Inventors John W. Schulenberg;
Sydney Archer, both of Bethlehem, N.Y.
[21] Appl. No. 632,948
[22] Filed Apr. 24, 1967
[45] Patented Dec. 14, 1971
[73] Assignee Sterling Drug Inc.
New York, N.Y.
Original application Oct. 16, 1964, Ser. No. 404,506, now Patent No. 3,350,405. Divided and this application Apr. 24, 1967, Ser. No. 632,948

[54] AMINO-LOWER-ALKOXY-DIBENZO[A,D] CYCLOHEPTENES AND 5-ALKYL AND -ARALKYL DERIVATIVES
4 Claims, No Drawings
[52] U.S. Cl.......................................................... 260/570.7,
260/239 B, 260/247.1, 260/247.7 C, 260/268 TR,
260/293.4 D, 260/294.7 C, 260/294.7 M,
260/326.5 SF, 260/326.5 CA, 260/326.5 M,
260/471 C, 260/488 CD, 260/501.18, 260/590,
260/520, 424/244, 424/248, 424/250, 424/267,
424/330
[51] Int. Cl......................................................... C07c 93/06
[50] Field of Search............................................. 260/570.8
TC, 501.18, 279 B, 247.1, 247.7, 268, 273.4,
274.7, 326.5, 570.7

[56] References Cited
UNITED STATES PATENTS
2,490,835 12/1949 Rieveschl et al............. 260/570
2,655,498 10/1953 Weston et al.................. 260/239
2,827,460 3/1958 Stein et al..................... 260/247.7
3,454,554 7/1969 Biel et al....................... 260/570.9 X
3,227,716 1/1966 Harms........................... 260/570.7 X
FOREIGN PATENTS
815,211 6/1959 Great Britain................ 260/570.7
908,316 10/1962 Great Britain................ 260/570.7
OTHER REFERENCES
Burger, " Medicinal Chemistry," 2nd Ed., pages 402 and 406– 408 (1960)
Kielholz et al., " Deut. Mediz," Vol. 88: No. 34, pages 1617– 1624 (1963)
Council on Drugs, " JAMA," Vol. 194, No. 7, pages 137– 138 (1965)
Protiva et al., " Jour. Med. Pharm. Chem.," Vol. 1, No. 2, pages 411– 415 (1961)

Primary Examiner—Robert V. Hines
Attorneys—Elmer J. Lawson, B. Woodrow Wyatt, Thomas L. Johnson, Robert K. Bair, R. Clifford Bourgeois, William G. Webb and Roger T. Wolfe ABSTRACT: Dibenzo[a,d]cyclohepten-5-ones and 10,11-dihydro derivatives thereof substituted on one of the benzene rings by an amino-lower-alkoxy group are prepared by reacting the corresponding hydroxydibenzo[a,d]cyclohepten-5-ones with an amino-lower-alkyl halide. The 5-carbonyl group is subsequently converted by reduction, Grignard and dehydration reactions to the groups $CH_2$, CH(OH), C(lower-alkyl)(OH), C(phenyl-lower-alkyl)(OH), C (lower-alkylidene), C (phenyl-lower-alkylidene), CH(lower-alkyl) or CH(phenyl-lower-alkyl). The compounds are useful as antidepressant agents.

AMINO-LOWER-ALKOXY-DIBENZO[A,D] CYCLOHEPTENES AND 5-ALKYL AND -ARALKYL DERIVATIVES

This application is a division of copending application Ser. No. 404,506, filed Oct. 16, 1964, now U.S. Pat. No. 3,350,405.

This invention relates to tricyclic compounds, and in particular is concerned with dibenzo[a,d]cyclohepten-5-ones substituted on one of the benzene rings by an amino-lower-alkoxy group, and derivatives thereof.

The compounds of the invention have the following general formula:

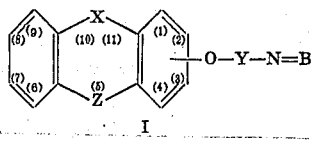

wherein N=B is amino or substituted amino, X is ethylene or vinylene, Y is lower-alkylene and Z is carbonyl or divalent groups derived by conventional transformations of the carbonyl group.

In the above formula I, N=B stands for an amino group which is basic and has a molecular weight less than about 200. A basic radical is one of the aliphatic or araliphatic type that imparts to the molecules which contain it sufficient basicity (ionization to the extent of at least $10^{+6}$) so that the compounds readily form acid-addition salts with strong inorganic and organic acids. A particularly preferred group of amino radicals include amino ($NH_2$), lower-alkylamino, cycloalkylamino, (phenyl-lower-alkyl)amino, di-lower-alkylamino, dicycloalkylamino, N-(cycloalkyl)-lower-alkylamino, polymethylenimino of 5-7 ring members, 4-morpholinyl, 1-piperazinyl, 4-lower-alkyl-1-piperazinyl, 4-phenyl-1-piperazinyl, di-(phenyl-lower-alkyl)amino, and N-(phenyl-lower-alkyl)-lower-alkylamino. In the foregoing groups, lower-alkyl has from one to six carbon atoms, and cycloalkyl has from five to six ring members, including cyclopentyl, cyclohexyl and lower-alkyl-substituted cyclopentyl and cyclohexyl. Polymethylenimino of 5-7 members includes 1-pyrrolidyl, 1-piperidyl, 1-hexamethyleniminyl and lower-alkylated derivatives thereof.

In the above formula I, X stands for ethylene ($CH_2CH_2$) or vinylene (CH=CH).

In the above formula I, Y stands for a lower-alkylene bridge having its connecting valences on different carbon atoms and contains at least two and not more than about five carbon atoms, thus including such radicals as $-CH_2CH_2-$, $-CH_2CH_2CH_2-$, $-CH(CH_3)CH_2-$, $-CH(CH_3)CH(CH_3)-$, $-CH_2CH_2CH_2CH_2-$, $-CH_2CH_2CH_2CH_2CH_2-$, and the like.

In the above formula I, Z stands for the carbonyl group or divalent groups derived therefrom. The latter include methylene ($CH_2$), carbinol [CH(OH)], lower-alkylcarbinol [C(lower-alkyl)(OH)], phenyl-lower-alkylcarbinol [C(phenyl-lower-alkyl)(OH)], C=(lower-alkylidene), C=(phenyl-lower-alkylidene), CH(lower-alkyl) and CH(phenyl-lower-alkyl). The lower-alkyl and lower-alkylidene groups contain from one to about six carbon atoms.

In the above formula I, the side-chain O—Y—N=B can be in any position of the benzene ring, preferably in the one-, two- or three-positions. The benzene rings of the tricyclic system as well as any phenyl groups present in the groups —N=B and Z can bear additional substituents inert under the conditions employed in preparing the compounds. Such additional substituents include lower-alkyl, lower-alkoxy, lower-alkylthio, lower-alkylsulfinyl and lower-alkylsulfonyl of one to six carbon atoms; halogen (including fluorine, chlorine, bromine and iodine); trifluoromethyl, and the like.

The compounds of formula I wherein X is $CH_2CH_2$ and Z is C=O are prepared as follows:

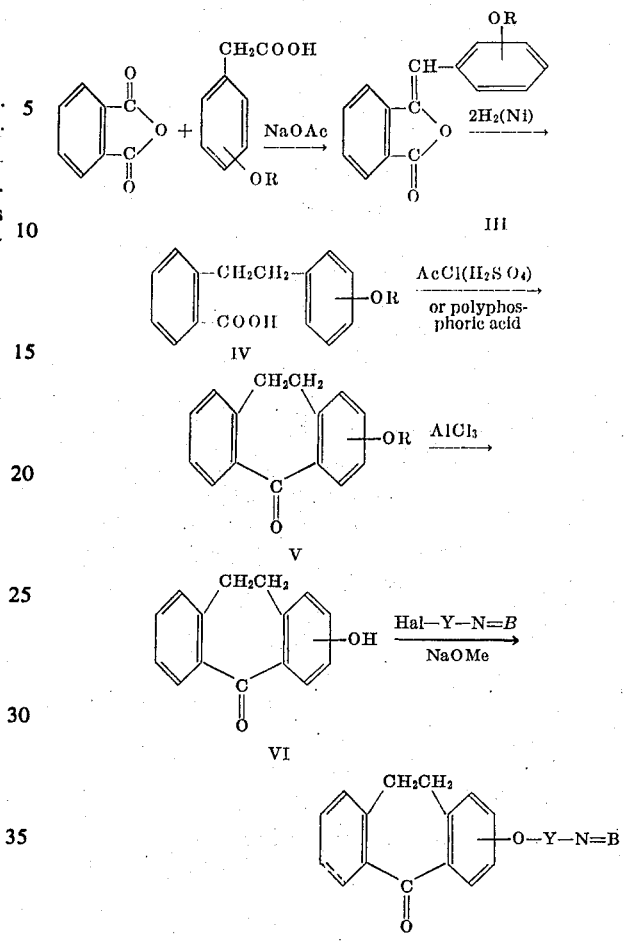

Phthalic anhydride is condensed with a lower-alkoxy-phenylacetic acid (R is lower-alkyl of one to six carbon atoms) in the presence of anhydrous sodium acetate to give a lower-alkoxy-benzylidenephthalide (III). The latter hydrogenated in the presence of Raney nickel is converted to a 2-[2-(lower-alkoxyphenyl)ethyl]benzoic acid (IV), which is then cyclized in the presence of polyphosphoric acid or acetyl chloride and sulfuric acid to give a lower-alkoxy-10,11-dihydro-5H-dibenzo-[a,d]cyclohepten-5-one (V). The latter is dealkylated with anhydrous aluminum chloride to hydroxy-10,11-dihydro-5H-dibenzo[a,d]cyclohepten-5-one (VI), which is then reacted with an aminoalkyl halide (Hal—Y—N=B) in the presence of a strong base, such as an alkali metal alkoxide, hydride or amide, to produce an amino-lower-alkoxy-10,11-dihydro-5H-dibenzo[a,d]-chclohepten-5-one (I; X is $CH_2CH_2$, Z is CO). The halogen (Hal) of the aminoalkyl halide, Hal—Y—N=B, can be any of the halogens, chlorine, bromine and iodine.

The compounds of formula I wherein X is CH=CH and Z is C=O are prepared as follows:

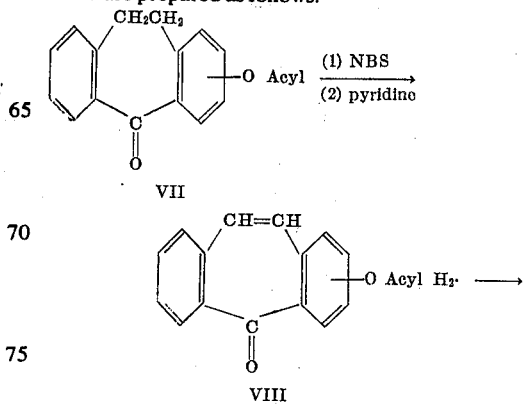

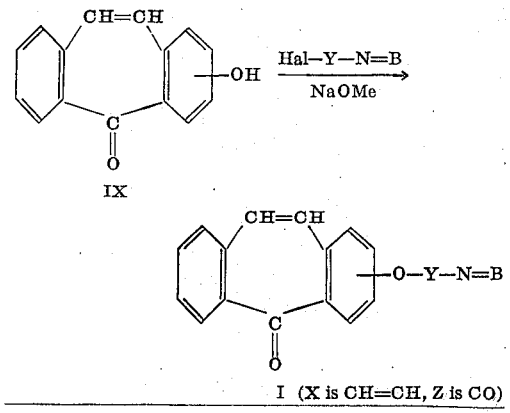

I (X is CH=CH, Z is CO)

An ester (VII) of a hydroxy-10,11-dihydro-5H-dibenzo-[a,d]cyclohepten-5-one (VI), such as the acetate or other lower-alkanoate of one to six carbon atoms, when treated with N-bromo-succinimide in the presence of a catalyst such as benzoyl peroxide, followed by treatment with pyridine, undergoes bromination and dehydrobromination to introduce unsaturation at the 10,11-position and produce an acyloxy-5H-dibenzo[a,d]cyclohepten-5-one (VIII). Alkaline hydrolysis of the latter gives a hydroxy-5H-dibenzo[a,d]cyclohepten-5-one (IX) which is then etherified with an aminoalkyl halide (Hal—Y—N=B) to give the desired aminoalkoxy-5H-dibenzo[a,d]cyclohepten-5-one (I; X is CH=CH, Z is CO).

The compounds of formula I wherein Z stands for a divalent group other than carbonyl and derived therefrom are prepared as follows:

Z is CH₂: by catalytic hydrogenation (palladium-on-charcoal) or by Wolff-Kishner reduction (alkaline treatment of the hydrazone) of compounds where Z is CO.

Z is CH(OH): by lithium aluminum hydride reduction of compounds where Z is CO.

Z is C(lower-alkyl)OH or C(phenyl-lower-alkyl)OH: by reacting a compound where Z is CO with a lower-alkyl or phenyl-lower-alkyl Grignard reagent.

Z is C=(lower-alkylidene) or C=(phenyl-lower-alkylidene): by dehydration, by means of acidic reagents, of compounds where Z is C(lower-alkyl)OH or C(phenyl-lower-alkyl)OH, respectively.

Z is CH(lower-alkyl) or CH(phenyl-lower-alkyl): by catalytic hydrogenation (palladium-on-charcoal) of compounds where Z is C=(lower-alkylidene) or C=(phenyl-lower-alkylidene), respectively.

The transformations of the carbonyl group can, of course, be carried out on intermediates, e.g., those of formulas VI and IX, prior to introducing the amino-lower-alkyl side-chain.

When the radical —N=B in the above formula I stands for an amino group other than tertiary-amino, that is, when there is at least one hydrogen atom attached to the nitrogen, it is preferred to use alternative routes of synthesis. One of these routes comprises condensing a compound of formula VI or IX with an N-benzyl-N-(R')-amino-lower-alkyl halide, wherein R' is lower-alkyl or cycloalkyl, in the presence of a strong base in the manner already described, and then subjecting the resulting N-benzyl-N-(R')-amino-lower-alkoxy compound to hydrogenolysis to remove the benzyl group and thus produce a compound of formula I wherein N=B is NH-R'. Alternatively, the N-benzyl group can be displaced by a carbethoxy group by reacting it with ethyl chloroformate and the resulting urethane cleaved by alkaline hydrolysis.

Still another way of introducing the amino-lower-alkoxy side-chain comprises reacting a compound of formula VI or IX with a lower-alkylene oxide, thereby forming a compound with a hydroxy-lower-alkoxy side-chain, —O—Y—OH, converting the latter to the p-toluenesulfonate ester, and then reacting the latter with ammonia or the appropriate amine, HN=B.

When a compound of the invention is treated with an equivalent amount of an inorganic or organic acid, it is converted to an acid-addition salt form. The salt form is the full equivalent of the free base insofar as the inherent properties of the cationic moiety is concerned. Water-soluble salt forms derived from acids whose anions are pharmaceutically acceptable are of special interest for therapeutic use, but salt forms which are water-insoluble or contain toxic anions are useful as characterizing derivatives of the free bases, or as intermediates in the purification of the free bases or in the preparation of other salts by ion exchange reactions.

Pharmacological testing of compounds of formula I has demonstrated that they are useful as antidepressant agents as evidenced by their ability to prevent and reverse reserpine ptosis in mice and by the fact that they inhibit the enzyme phenylamine β-hydroxylase in vitro. Anticonvulsant and psychomotor activity have also been found in the compounds of the invention.

The structures of the compounds of the invention were established by elementary analyses, by the modes of preparation and by ultraviolet and infrared spectra.

The following examples will further illustrate the invention without the latter being limited thereby.

EXAMPLE 1 a. m-Anisylidenephthalide [III; OR is m—OCH₃]

A mixture of 99.5 g. of m-methoxyphenylacetic acid, 78.9 g. of phthalic anhydride and 6 g. of anhydrous sodium acetate was heated gradually to 260° C. in a Wood's metal bath over a period of 40 minutes and held at this temperature for about 75 minutes while allowing the mixture to distill. The reaction mixture was cooled, 1,000 ml. of ethanol was added, and the solid product was collected by filtration and washed with hot ethanol. The product was recrystallized from ethanol to give 97.9 g. of m-anisylidenephthalide in the form of yellow-tan needles, m.p. 120.5°–122° C. (uncorr.).

b. 2-[2-(m-Methoxyphenyl)ethyl]benzoic acid [IV; OR is m—OCH₃]

A mixture of 212.9 g. of m-anisylidenephthalide and 1,600 ml. of absolute ethanol was hydrogenated in the presence of 200 g. of Raney nickel catalyst until two molar equivalents of hydrogen had been absorbed. The hydrogenation was complete in about 3 hours, and the catalyst was removed by filtration. The filtrate was evaporated to dryness and the residue was taken up in 1 liter of chloroform and stirred and heated with 60 g. of sodium bicarbonate in 3 liters of water. The aqueous solution was separated, filtered and acidified, and the precipitated acid was collected, washed with water and dried for 24 hours at 60°–70° C. over phosphorus pentoxide to give 83.3 g. of 2-[2-(m-methoxyphenyl)ethyl]benzoic acid, m.p. 116.8°–119° C. (uncorr.).

c. 2-Methoxy-10,11-dihydro-5H-dibenzo[a,d]cyclohepten-5-one [V; OR is 2-OCH₃]

2-[2-(m-Methoxyphenyl)ethyl]benzoic acid (10.25 g.) and 100 ml. of acetyl chloride were stirred and warmed until solution was complete. Sulfuric acid (0.5 ml. was added, followed by stirring while allowing the excess acetyl chloride to boil off over a period of 40 minutes. The resulting orange solution was poured into 400 ml. of water and the solid product was collected by filtration. The product was recrystallized from aqueous ethanol and dried over phosphorus pentoxide for 60 hours to give 7.4 g. of 2-methoxy-10,11-dihydro-5H-dibenzo[a,d]cyclohepten-5-one in the form of colorless needles, m.p. 71.2°–73.5° C. (uncorr.); ultraviolet maxima at 238 and 300 mμ (ε=9,300 and 14,300), infrared absorption at 6.18, 6.29 and 6.37 μ.

d. 2-Hydroxy-10,11-dihydro-5H-dibenzo[a,d]cyclohepten-5-one [VI; 2—OH]

A mixture of 11.94 g. of 2-methoxy-10,11-dihydro-5H-dibenzo[a,d]cyclohepten-5-one, 20.0 g. of anhydrous aluminum chloride and 250 ml. of toluene was stirred under reflux for 1¾ hours. The excess aluminum chloride was decomposed by addition of ice water, and the solid product was collected by filtration and washed with water. The benzene layer was concentrated to dryness and the residue combined with the filtered solid product. The combined product was suspended in methanol and the suspension filtered and concentrated to dryness. The latter residue was suspended in 5 percent sodium hydroxide solution, filtered, and the filtrate made acid with acetic acid. The precipitated product was collected, suspended in methanol and the insoluble material removed by filtration. The filtrate was concentrated to a volume of less than 500 ml. and water was added to the point of turbidity. The solution was chilled and the product collected to give 11.06 g. of 2-hydroxy-10,11-dihydro-5H-dibenzo[a,d]cyclohepten-5-one in the form of yellow plates, m.p. 141.4°–143.8° C. (corr.) when recrystalized from aqueous methanol.

2-Acetoxy-10,11-dihydro-5H-dibenzo[a,d]cyclohepten-5-one was prepared by treating 2-hydroxy-10,11-dihydro-5H-dibenzo-[a,d]cyclohepten-5-one with an excess of acetic anhydride in pyridine solution and was obtained in the form of colorless plates, m.p. 64°–65° C. (uncorr.).

EXAMPLE 2 a. p-Anisylidenephthalide [III; OR is p—OCH$_3$] was prepared from 166.2 g. of p-methoxyphenylacetic acid, 141.1 g. of phthalic anhydride and 10.0 g. of anhydrous sodium acetate according to the procedure described above in example 1, part (a), and was obtained in the form of yellow needles (129 g.), m.p. 145.8°–148.0° C. (uncorr.).

b. 2-[2-(p-Methoxyphenyl)ethyl]benzoic acid [IV; OR is p—OCH$_3$] was prepared by hydrogenation of 126.1 g. of p-anisylidenephthalide according to the procedure described above in example 1, part (b). There was thus obtained 84.5 g. of 2-[2-(p-methoxyphenyl)ethyl]benzoic acid, m.p. 117.5°–118.5° C. (uncorr.).

c. 3-Methoxy-10,11-dihydro-5H-dibenzo[a,d]cyclohepten-5-one [V; OR is 3-OCH$_3$]

A mixture of 10.25 g. of 2-[2-(p-methoxyphenyl)ethyl]-benzoic acid and 75 ml. of polyphosphoric acid was stirred and heated at 110° C. for 5 hours. The reaction mixture was added to 800 ml. of water, extracted with chloroform, and the chloroform extracts washed with water, saturated sodium chloride solution, and filtered. Excess dilute sodium carbonate solution (300 ml.) was added, and the mixture stirred and warmed to evaporate the chloroform. The resulting suspension was extracted with ether and with chloroform, and the organic extracts were washed with water, saturated sodium chloride, dried and concentrated to give 8.63 g. of 3-methoxy-10,11-dihydro-5H-dibenzo[a,d]cyclohepten-5-one which was used in the following procedure without further purification.

d. 3-Hydroxy-10,11-dihydro-5H-dibenzo[a,d]cyclohepten-5-one [VI; 3-OH] was prepared from 2.88 g. of 3-methoxy-10,11-dihydro-5H-dibenzo[a,d]cyclohepten-5-one and 5.0 g. of aluminum chloride according to the procedure described above in example 1, part (d). The product was recrystallized from methanol to obtain 3-hydroxy-10,11-dihydro-5H-dibenzo[a,d]cyclohepten-5-one in the form of light tan platelets, m.p. 146°–147.2° C. (uncorr.).

By replacing the m-methoxyphenylacetic acid in example 1 by a molar equivalent amount of o-methoxyphenylacetic acid and carrying it through the succeeding transformations, there can be obtained 1-hydroxy-10,11-dihydro-5H-dibenzo[a,d]-cyclohepten-5-one [VI; 1—OH].

By replacing the phthalic anhydride in example 1 by a molar equivalent amount of 3,4-dimethoxyphthalic anhydride or 3,4-dimethylphthalic anhydride there can be obtained, respectively, 2-hydroxy-7,8-dimethoxy-10,11-dihydro-5H-dibenzo[a,d]cyclohepten-5-one or 2-hydroxy-7,8-dimethyl-10,11-dihydro-5H-dibenzo[a,d]cyclohepten-5-one.

EXAMPLE 3 a. 2-Acetoxy-5H-dibenzo[a,d]cyclohepten-5-one [VIII; OAcyl is 2—OCOCH$_3$]

A mixture of 2.66 g. of 2-acetoxy-10,11-dihydro-5H-dibenzo[a,d]cyclohepten-5-one [example 1, part (d)], 2.14 g. of N-bromosuccinimide, 0.11 g. of benzoyl peroxide and 50 ml. of carbon tetrachloride was stirred at reflux for 1½ hours. The reaction mixture was filtered into 50 ml. of pyridine and allowed to stand at room temperature for 3 days. The mixture was then heated while distilling off the carbon tetrachloride and pyridine over a period of 5 hours. The residue was added to water, the product was collected, washed with water, dried and recrystallized from petroleum ether (Skelly-solve C) to give 1.57 g. of 2-acetoxy-5H-dibenzo[a,d]cyclohepten-5-one in the form of pale yellow plates, m.p. 102.5°–105.5° C. (uncorr.).

b. 2-Hydroxy-5H-dibenzo[a,d]cyclohepten-5-one [IX; 2—OH]

A mixture of 1.53 g. of 2-acetoxy-5H-dibenzo[a,d]cyclohepten-5-one and 50 ml. of 5 percent aqueous sodium hydroxide was allowed to stand at room temperature overnight, and then was stirred for 1 hour and filtered. The filtrate was saturated with carbon dioxide and the precipitated product was collected and recrystallized from aqueous methanol to give 1.18 g. of 2-hydroxy-5H-dibenzo[a,d]cyclohepten-5-one as a light tan solid, m.p. 195°–198° C. (uncorr.); ultraviolet maxima at 226, 249, 279 and 350 m$\mu$ ($\epsilon$=13,500, 22,900, 36,100 and 3,350), infrared absorption at 6.25, 6.40, 6.49 and 7.02 $\mu$.

By replacing the 2-acetoxy-10,11-dihydro-5H-dibenzo[a,d]cyclohepten-5-one in example 3, part (a) by a molar equivalent amount of the acetates of 3-hydroxy-10,11-dihydro-5H-dibenzo[a,d]cyclohepten-5-one, 1-hydroxy-10,11-dihydro-5H-dibenzo[a,d]cyclohepten-5-one, 2-hydroxy-7,8-dimethoxy-10,11-dihydro-5H-dibenzo[a,d]cyclohepten-5-one or 2-hydroxy-7,8-dimethyl-10,11-dihydro-5H-dibenzo[a,d]cyclohepten-5-one there can be obtained, respectively, 3-hydroxy-5H-dibenzo[a,d]cyclohepten-5-one, 1-hydroxy-5H-dibenzo[a,d]cyclohepten-5-one, 2-hydroxy-7,8-dimethoxy-5H-dibenzo[a,d]cyclohepten-5-one or 2-hydroxy-7,8-dimethyl-5H-dibenzo[a,d]cyclohepten-5-one.

EXAMPLE 4

2-Hydroxy-10,11-dihydro-5H-dibenzo[a,d]cycloheptene

A solution of 5.84 g. of 2-hydroxy-10,11-dihydro-5H-dibenzo[a,d]cyclohepten-5-one [example 1, part (d)] in 200 ml. of acetic acid was hydrogenated in the presence of 1.74 g. of palladium-on-charcoal catalyst. The hydrogenation was complete in 16 hours, the catalyst was removed by filtration and the filtrate concentrated to dryness. The residue was dissolved in dilute aqueous sodium hydroxide, the solution filtered and saturated with carbon dioxide. The product was collected, dried and recrystallized from benzene to give 4.54 g. of 2-hydroxy-10,11-dihydro-5H-dibenzo[a,d]cycloheptene in the form of light tan platelets, m.p. 164.5°–167° C. (uncorr.).

By replacing the 2-hydroxy-10,11-dihydro-5H-dibenzo-[a,d]cyclohepten-5-one in the foregoing preparation by a molar equivalent amount of 3-hydroxy-10,11-dihydro-5H-dibenzo[a,d]-cyclohepten-5-one, 1-hydroxy-10,11-dihydro-5H-dibenzo[a,d]cyclohepten-5-one, 2-hydroxy-7,8-dimethoxy-10,11-dihydro-5H-dibenzo-[a,d]cyclohepten-5-one or 2-hydroxy-7,8-dimethyl-10,11-dihydro-5H-dibenzo[a,d]cyclohepten-5-one there can be obtained, respectively, 3-hydroxy-10,11-dihydro-5H-dibenzo[a,d]cycloheptene, 1-hydroxy-10,11-dihydro-5H-dibenzo[a,d]cycloheptene, 2-hydroxy-7,8-dimethoxy-10,11-dihydro-5H-dibenzo[a,d]cycloheptene, or 2-hydroxy-7,8-dimethyl-10,11-dihydro-5H-dibenzo[a,d]cycloheptene.

EXAMPLE 5

2-(2-Diethylaminoethoxy)-10,11-dihydro-5H-dibenzo[a,d]cyclohepten-5-one [I; X is CH$_2$CH$_2$, Y is CH$_2$CH$_2$, Z is CO, N=B is N(C$_2$H$_5$)$_2$]

2-Hydroxy-10,11-dihydro-5H-dibenzo[a,d]cyclohepten-5-one (8.38 g.) (example 1) and 2.52 g. of sodium methoxide were suspended in 300 ml. of chlorobenzene. The mixture was distilled until the head temperature reached 132° C. The suspension was cooled and 6.34 g. of 2-diethylaminoethyl chloride was added. The reaction mixture was stirred under reflux for 2½ hours. There was then added 40 ml. of 35 percent aqueous sodium hydroxide, the layers were separated and the sodium hydroxide solution washed with chloroform. The combined organic extracts were washed three times with water and twice with saturated sodium chloride solution and dried over anhydrous magnesium sulfate. The solvents were evaporated, the residue dissolved in 200–250 ml. of ether and an excess of ethereal hydrogen chloride was added. The hydrochloride salt which separated was collected and recrystallized from an isopropyl alcohol-ether mixture to give 9.10 g. of 2-(2-diethyl-aminoethyoxy)-10,11-dihydro-5H-dibenzo[a,d]cyclohepten-5-one in the form of its hydrochloride salt, pale yellow needles, m.p. 118.6°–120.4° C. (corr.).

2-(2-Diethylaminoethoxy)-10,11-dihydro-5H-dibenzo[a,d]-cyclohepten-5-one was found to be active in reversing ptosis at 75 mg./kg. when injected intraperitoneally to mice medicated with 2 mg./kg. of reserpine; and was found to be 204 percent as active as imipramine in inhibition of phenylamine β-hydroxylase in vitro.

The examples in the following table were prepared according to the procedure described in example 5, using the appropriate starting material of examples 1–4 and the appropriate aminoalkyl halide. The compounds of the table have antidepressant activities similar to those of the compound of example 5.

cyclohepten-5-one, 2-[2-(1-hexamethyleniminyl)ethoxy]-10,11-dihydro-5H-dibenzo[a,d]cyclohepten-5-one, 2-[2-(4-morpholinyl)-ethoxy]-10,11-dihydro-5H-dibenzo[a,d]cyclohepten-5-one, 2-[2-(1-piperazinyl)ethoxy]-10,11-dihydro-5H-dibenzo[a,d]cyclohepten-5-one, 2-[2-(4-methyl-1-piperazinyl)ethoxy]-10,11-dihydro-5H-dibenzo[a,d]cyclohepten-5-one, 2-[2-(4-phenyl-1-piperazinyl)-ethoxy]-10,11-dihydro-5H-dibenzo[a,d]cyclohepten-5-one, 2-(2-dibenzylaminoethoxy)-10,11-dihydro-5H-dibenzo[a,d]cyclohepten-5-one, or 2-[2-(4-methyl-1-piperidyl)ethoxy]-10,11-dihydro-5H-dibenzo[a,d]cyclohepten-5-one.

By replacing the 2-hydroxy-10,11-dihydro-5H-dibenzo[a,d]cyclohepten-5-one in example 5 by a molar equivalent amount of 2-hydroxy-7,8-dimethoxy-10,11-dihydro-5H-dibenzo[a,d]cyclohepten-5-one, 2-hydroxy-7,8-dimethyl-10,11-dihydro-5H-dibenzo[a,d]cyclohepten-5-one, 3-hydroxy-5H-dibenzo[a,d]cyclohepten-5-one, 1-hydroxy-5H-dibenzo[a,d]cyclohepten-5-one, 2-hydroxy-7,8-dimethoxy-5H-dibenzo[a,d]cyclohepten-5-one, 2-hydroxy-7,8-dimethyl-5H-dibenzo[a,d]cyclohepten-5-one,3-hydroxy-10,11-dihydro-5H-dibenzo[a,d]cycloheptene, 1-hydroxy-10,11-dihydro-5H-dibenzo[a,d]cycloheptene, 2-hydroxy-7,8-dimethoxy-10,11-dihydro-5H-dibenzo[a,d]cycloheptene or 2-hydroxy-7,8-dimethyl-10,11-dihydro-5H-dibenzo[a,d]cycloheptene there can be obtained, respectively, 2-(2-diethylaminoethoxy)-7,8-dimethoxy-10,11-dihydro-5H-dibenzo[a,d]cyclohepten-5-one, 2-(2-diethylaminoethoxy)-7,8-dimethyl-10,11-dihydro-5H-dibenzo[a,d]cyclohepten-5-one, 3-(2-diethylaminoethoxy)-5H-dibenzo[a,d]cyclohepten-

| Example | X | Z | Y—N=B | Position of side-chain | M.P., ° C. (corr.) of HCl salt |
|---|---|---|---|---|---|
| 6 | CH=CH | C=O | CH$_2$CH$_2$N(C$_2$H$_5$)$_2$ | 2 | 140.8–142.2 |
| 7 | CH=CH | C=O | CH$_2$CH$_2$CH$_2$N(CH$_3$)$_2$ | 2 | 193.2–193.8 |
| 8 | CH=CH | C=O | CH$_2$CH$_2$N(CH$_3$)$_2$ | 2 | 183.8–186.0 |
| 9 | CH$_2$CH$_2$ | C=O | CH$_2$CH$_2$CH$_2$N(CH$_3$)$_2$ | 2 | 193.6–194.8 |
| 10 | CH$_2$CH$_2$ | C=O | CH$_2$CH$_2$N(CH$_3$)$_2$ | 2 | 211.2–212.8 |
| 11 | CH$_2$CH$_2$ | C=O | CH$_2$CH$_2$N(CH$_3$)(CH$_2$C$_6$H$_5$) | 2 | 165.8–175.0 |
| 12 | CH=CH | C=O | CH$_2$CH$_2$N(CH$_3$)(CH$_2$C$_6$H$_5$) | 2 | 199.2–200.8 |
| 13 | CH=CH | C=O | CH$_2$CH$_2$N(CH$_2$CH$_2$)(CH$_2$CH$_2$) (pyrrolidinyl-type) | 2 | 182.8–184.2 |
| 14 | CH$_2$CH$_2$ | C=O | CH$_2$CH$_2$N(CH$_2$CH$_2$)(CH$_2$CH$_2$) | 2 | 201.0–202.6 |
| 15 | CH=CH | C=O | CH$_2$CH$_2$N(CH$_2$CH$_2$)(CH$_2$CH$_2$)CH$_2$ | 2 | 199.2–200.6 |
| 16 | CH$_2$CH$_2$ | C=O | CH$_2$CH$_2$N(CH$_2$CH$_2$)(CH$_2$CH$_2$)CH$_2$ | 2 | 171.2–173.8 |
| 17 | CH$_2$CH$_2$ | C=O | CH$_2$CH$_2$N(CH$_3$)$_2$ | 3 | 168.6–170.6 |
| 18 | CH$_2$CH$_2$ | CH$_2$ | CH$_2$CH$_2$N(CH$_3$)$_2$ | 2 | 173.0–175.0 |

By replacing the 2-diethylaminoethyl chloride in example 5 by a molar equivalent amount of 2-dimethylaminopropyl chloride, 5-dimethylaminopentyl chloride, 2-dicyclohexylaminoethyl chloride, 2-(N-cyclopentyl)(N-methyl)aminoethyl chloride, 2-(1-hexamethyleniminyl)ethyl chloride, 2-(4-morpholinyl)ethyl chloride, 2-(1-piperazinyl)ethyl chloride, 2-(4-methyl-1-piperazinyl)ethyl chloride, 2-(4-methyl-1-piperazinyl)ethyl chloride, 2-(4-phenyl-1-piperazinyl)ethyl chloride, 2-dibenzylaminoethyl chloride or 2-(4-methyl-1-piperidyl)ethyl chloride there can be obtained, respectively, 2-(2-dimethylaminopropoxy)-10,11-dihydro-5H-dibenzo[a,d]cyclohepten-5-one, 2-(5-dimethylaminopentoxy)-10,11-dihydro-5H-dibenzo[a,d]cyclohepten-5-one, 2-(2-dicyclohexylaminoethoxy)-10,11-dihydro-5H-dibenzo[a,d]cyclohepten-5-one, 2-[2-(N-cyclopentyl)(N-methyl)aminoethoxy]-10,11-dihydro-5H-dibenzo[a,d]-

5-one, 1-(2-diethylaminoethoxy)-5H-dibenzo[a,d]cyclohepten-5-one,2-(2-diethylaminoethoxy)-7,8-dimethoxy-5H-dibenzo[a,d]cyclohepten-5-one, 2-(2-diethylaminoethoxy)-7,8-dimethyl-5H-dibenzo[a,d]cyclohepten-5-one, 3-(2-diethylaminoethoxy)-10,11-dihydro-5H-dibenzo[a,d]cycloheptene, 1-(2-diethylaminoethoxy)-10,11-dihydro-5H-dibenzo[a,d]cycloheptene, 2-(2-diethylaminoethoxy)-7,8-dimethoxy-10,11-dihydro-5H-dibenzo[a,d]cycloheptene or 2-(2-diethylaminoethoxy)-7,8-dimethyl-10,11-dihydro-5H-dibenzo[a,d]cycloheptene.

EXAMPLE 19

5-Benzyl-2-(2-diethylaminoethoxy)-10,11-dihydro-5-hydroxy-5H-dibenzo[a,d]cycloheptene [I; X is CH$_2$CH$_2$, Y is CH$_2$CH$_2$, Z is C(OH)(CH$_2$C$_6$H$_5$), N=B is N(C$_2$H$_5$)$_2$]

2-(2-Diethylaminoethoxy)-10,11-dihydro-5H-dibenzo-[a,d]cyclohepten-5-one in the form of its hydrochloride salt (5.00 g.) (example 5) was converted to the free base with a slight excess of aqueous sodium carbonate solution. The base was extracted with ether, the ether extract washed with water and saturated sodium chloride solution, dried over anhydrous calcium sulfate and concentrated to a volume of 50 ml.

A few drops of benzyl chloride was added to 0.71 g. of magnesium turnings covered by 40 ml. of dry ether, reaction was initiated with a stirring rod, and the remainder of 3.52 g. of benzyl chloride was added over a period of 10 minutes. The Grignard reagent was stirred at reflux for 15 minutes and then the ether solution containing 2-(2-diethylaminoethoxy)-10,11-dihydro-5H-dibenzo[a,d]cyclohepten-5-one was added over a period of 10 minutes. The reaction mixture was refluxed for 3½ hours, ice was added and the mixture was filtered. The aqueous layer was extracted with ether and the combined ether layers were dried over anhydrous magnesium sulfate and concentrated. The residue was triturated with hexane to give 4.24 g. of 5-benzyl-2-(2-diethylaminoethoxy)-10,11-dihydro-5-hydroxy-5H-dibenzo[a,d]cycloheptene, m.p. 70.2°–81.0° C. (corr.).

EXAMPLE 20

5-(p-Chlorobenzyl)-2-(2-diethylaminoethoxy)-10,11-dihydro-5-hydroxy-5H-dibenzo[a,d]cycloheptene [I; X is $CH_2CH_2$, Y is $CH_2CH_2$, Z is $C(OH)(CH_2C_6H_4Cl-4)$, N=B is $N(C_2H_5)$] was prepared from 2-(2-diethylaminoethoxy)-10,11-dihydro-5H-dibenzo[a,d]cyclohepten-5-one (from 15.68 g. of the hydrochloride salt) and the Grignard reagent from 2.22 g. of magnesium and 14.05 g. of p-chlorobenzyl chloride according to the procedure described above in example 19. The crude product was recrystallized from hexane to give 6.77 g. of 5-(p-chlorobenzyl)-2-(2-diethylaminoethoxy)-10,11-dihydro-5-hydroxy-5H-dibenzo[a,d]cycloheptene, m.p. 90.0°–95.0° C. (corr.).

5-(p-Chlorobenzyl)-2-(2-diethylaminoethoxy)-10,11-dihydro-5-hydroxy-5H-dibenzo[a,d]cycloheptene was found to be active in potentiating hexobarbital when administered intraperitoneally to mice at a dose level of 100–200 mg./kg.

EXAMPLE 21

2-(2-Dimethylaminoethoxy)-10,11-dihydro-5-hydroxy-5-methyl-5H-dibenzo[a,d]cycloheptene [I; X is $CH_2CH_2$, Y is $CH_2CH_2$, Z is $C(CH_3)(OH)$, N=B is $N(CH_3)_2$] was prepared from 2-(2-dimethylaminoethoxy)-10,11-dihydro-5H-dibenzo[a,d]cyclohepten-5-one (from 10.62 g. of the hydrochloride salt) (example 10) and the Grignard reagent from 1.64 g. of magnesium and 4.0 ml. of methyl iodide according to the procedure described above in example 19. The product was recrystallized from acetone to give 6.64 g. of 2-(2-dimethylaminoethoxy)-10,11-dihydro-5-hydroxy-5-methyl-5H-dibenzo[a,d]cycloheptene in the form of colorless prisms, m.p. 151.0°–152.6° C. (corr.).

EXAMPLE 22

2-(2-Dimethylaminoethoxy)-5-hydroxy-5-methyl-5H-dibenzo[a,d]cycloheptene [I; X is CH=CH, Y is $CH_2CH_2$, Z is $C(CH_3)(OH)$, N=B is $N(CH_3)_2$] was prepared from 2-(2-dimethylaminoethoxy)-5H-dibenzo[a,d]cyclohepten-5-one (from 8.09 g. of the hydrochloride salt) (example 8) and the Grignard reagent from 1.25 g. of magnesium and 3.08 ml. of methyl iodide according to the procedure described above in example 19. The product was recrystallized from acetone to give 4.98 g. of 2-(2-dimethylaminoethoxy)-5-hydroxy-5-methyl-5H-dibenzo[a,d]cycloheptene in the form of light tan prisms, m.p. 150°–153.6° C. (corr.).

EXAMPLE 23

5-(p-Chlorobenzyl)-2-(2-diethylaminoethoxy)-5-hydroxy-5H-dibenzo-[a,d]cycloheptene [I; X is CH=CH, Y is $CH_2CH_2$, Z is $C(OH)(CH_2C_6H_4Cl-4)$, N=B is $N(C_2H_5)_2$] was prepared from 4.18 g. of 2-(2-diethylaminoethoxy)-5H-dibenzo[a,d]cyclohepten-5-one (example 6) and the Grignard reagent from 0.66 g. of magnesium and 4.19 g. of p-chlorobenzyl chloride. The product was chromatographed on silica gel, eluted with ether and then recrystallized from hexane to give 5-(p-chlorobenzyl)-2-(2-diethylaminoethoxy)-5-hydroxy-5H-dibenzo[a,d]cycloheptene, m.p. 83°–88° C. (uncorr.).

By replacing the benzyl chloride in example 19 by a molar equivalent amount of n-hexyl bromide or 2-phenylethyl bromide there can be obtained, respectively, 5-(n-hexyl)-2-(2-diethylaminoethoxy)-10,11-dihydro-5-hydroxy-5H-dibenzo[a,d]cycloheptene or 5-(2-phenylethyl)-2-(2-diethylaminoethoxy)-10,11-dihydro-5-hydroxy-5H-dibenzo[a,d]cycloheptene.

By replacing the 2-(2-diethylaminoethoxy)-10,11-dihydro-5H-dibenzo[a,d]cyclohepten-5-one in example 19 by a molar equivalent amount of 2-[2-(N-benzyl-N-methylamino)ethoxy]-10,11-dihydro-5H-dibenzo[a,d]cyclohepten-5-one, 2-[2-(1-pyrrolidyl)ethoxy]-5H-dibenzo[a,d]cyclohepten-5-one, 2-[2-(1-piperidyl)ethoxy]-5H-dibenzo[a,d]cyclohepten-5-one, 3-(2-dimethylaminoethoxy)-10,11-dihydro-5H-dibenzo[a,d]cyclohepten-5-one, 1-(2-diethylaminoethoxy)-5H-dibenzo[a,d]cyclohepten-5-one, or 2-(2-diethylaminoethoxy)-7,8-dimethoxy-10,11-dihydro-5H-dibenzo[a,d]cyclohepten-5-one, there can be obtained, respectively 5-benzyl-2-[2-(N-benzyl-N-methylamino)ethoxy]-10,11-dihydro-5-hydroxy-5H-dibenzo[a,d]cycloheptene, 5-benzyl-2-[2-(1-pyrrolidyl)ethoxy]-5-hydroxy-5H-dibenzo[a,d]cycloheptene, 5-benzyl-2-[2-(1-piperidyl)ethoxy]-5-hydroxy-5H-dibenzo[a,d]-cycloheptene, 5-benzyl-3-(2-dimethylaminoethoxy)-10,11-dihydro-5-hydroxy-5H-dibenzo[a,d]cycloheptene, 5-benzyl-1-(2-diethylaminoethoxy)-5-hydroxy-5H-dibenzo[a,d]cycloheptene, or 5-benzyl-2-(2-diethylaminoethoxy)-7,8-dimethoxy-10,11-dihydro-5-hydroxy-5H-dibenzo[a,d]cycloheptene.

EXAMPLE 24

2-(2-Dimethylaminoethoxy)-5-methylene-10,11-dihydro-5H-dibenzo[a,d]cycloheptene [I; X is $CH_2CH_2$, Y is $CH_2CH_2$, Z is C=$CH_2$, N=B is $N(CH_3)_2$]

2-(2-Dimethylaminoethoxy)-10,11-dihydro-5-hydroxy-5-methyl-5H-dibenzo[a,d]cycloheptene (4.63 g.) (example 21) was dissolved in 300 ml. of benzene and 200 ml. of chloroform. To this solution was added 20 ml. of a saturated solution of hydrogen chloride in ether and the mixture was allowed to stand for 24 hours. The solvents were distilled off slowly, the residual suspension diluted with dry ether and the product collected and recrystallized from chloroform-benzene to give 3.80 g. of 2-(2-dimethylaminoethoxy)-5-methylene-10,11-dihydro-5H-dibenzo[a,d]cycloheptene in the form of its hydrochloride salt, m.p. 188°–189° C. (corr.).

By replacing the 2-(2-dimethylaminoethoxy)-10,11-dihydro-5-hydroxy-5-methyl-5H-dibenzo[a,d]cycloheptene in example 24 by a molar equivalent amount of 5-benzyl-2-(2-diethylaminoethoxy)-10,11-dihydro-5-hydroxy-5H-dibenzo[a,d]cycloheptene, 5-(p-chlorobenzyl)-2-(2-diethylaminoethoxy)-5-hydroxy-5H-dibenzo[a,d]cycloheptene, 5-(n-hexyl)-2-(2-diethylaminoethoxy)-10,11-dihydro-5-hydroxy-5H-dibenzo[a,d]cycloheptene, or 5-(2-phenylethyl)-2-(2-diethylaminoethoxy)-10,11-dihydro-5-hydroxy-5H-dibenzo[a,d]cycloheptene, there can be obtained, respectively, 2-(2-diethylaminoethoxy)-5-benzylidene-10,11-dihydro-5H-dibenzo[a,d]cycloheptene, 2-(2-diethylaminoethoxy)-5-(p-chlorobenzylidene)-5H-dibenzo[a,d]cycloheptene, 2-(2-diethylaminoethoxy)-5-(n-hexylidene)-10,11-dihydro-5H-dibenzo[a,d]cycloheptene, or 2-(2-diethylaminoethoxy)-5-(2-phenylethylidene)-10,11-dihydro-5H-dibenzo[a,d]cycloheptene.

EXAMPLE 25

2-(2-Dimethylaminoethoxy)-10,11-dihydro-5-methyl-5H- dibenzo[a,d]cycloheptene, [I; X is CH$_2$CH$_2$, Y is CH$_2$CH$_2$, Z is CHCH$_3$, N=B is N(CH$_3$)$_2$]

A solution of 2.05 g. of 2-(2-dimethylaminoethoxy)-5-methylene-10,11-dihydro-5H-dibenzo[a,d]cycloheptene in the form of its hydrochloride salt (example 24) in 200 ml. of ethanol was hydrogenated at room temperature in the presence of 0.25 g. of palladium-on-charcoal catalyst. After 2¼ hours the requisite mole-equivalent of hydrogen had been absorbed, and the mixture was filtered and concentrated to dryness. The residue was recrystallized from a chloroform-benzene mixture to give 2.01 g. of 2-(2-dimethylaminoethoxy)-10,11-dihydro-5-methyl-5H-dibenzo[a,d]cycloheptene in the form of its hydrochloride salt, m.p. 146.8°–152.0° C. (corr.).

2-(2-Dimethylaminoethoxy)-10,11-dihydro-5-methyl-5H-dibenzo[a,d]cycloheptene was found to be active at 30 mg./kg. in reversing reserpine ptosis in mice.

By replacing the 2-(2-dimethylaminoethoxy)-5-methylene-10,11-dihydro-5H-dibenzo[a,d]cycloheptene in Example 25 by a molar equivalent amount of 2-(2-diethylaminoethoxy)-5-benzylidene-10,11-dihydro-5H-dibenzo[a,d]cycloheptene, 2-(2-diethylaminoethoxy)-5-(p-chlorobenzylidene)-5H-dibenzo[a,d]cycloheptene, 2-(2-diethylaminoethoxy)-5-(n-hexylidene)-10,11-dihydro-5H-dibenzo[a,d]cycloheptene, or 2-(2-diethylaminoethoxy)-5-(2-phenylethylidene)-10,11-dihydro-5H-dibenzo[a,d]cycloheptene, there can be obtained, respectively, 2-(2-diethylaminoethoxy)-5-benzyl-10,11-dihydro-5H-dibenzo[a,d]cycloheptene, 2-(2-diethylaminoethoxy)-5-(p-chlorobenzyl)-5H-dibenzo[a,d]cycloheptene, 2-(2-diethylaminoethoxy)-5-(n-hexl)-10,11-dihydro-5H-dibenzo-[a,d]cycloheptene, or 2-(2-diethylaminoethoxy)-5-(2-phenylethyl)-10,11-dihydro-5H-dibenzo[a,d]cycloheptene.

EXAMPLE 26

2-(2-Dimethylaminoethoxy)-10,11-dihydro-5-hydroxy-5H-dibenzo[a,d]cycloheptene [I; X is CH$_2$CH$_2$, Y is CH$_2$CH$_2$, Z is CHOH, N=B is N(CH$_3$)$_2$]

2-(2-Dimethylaminoethoxy)-10,11-dihydro-5H-dibenzo[a,d]cyclohepten-5-one (from 3.98 g. of its hydrochloride salt) (example 10), was dissolved in 100 ml. of tetrahydrofuran, 0.91 g. of lithium aluminum hydride was added, and the mixture was stirred for 6 hours. The reaction mixture was filtered, the solid material slurried with hot chloroform, and the tetrahydrofuran and chloroform solutions were combined and concentrated to dryness. The residue was crystallized from 40 ml. of ether to give 2.77 g. of 2-(2-dimethylaminoethoxy)-10,11-dihydro-5-hydroxy-5H-dibenzo[a,d]cycloheptene, m.p. 100.8°–103.2° C. (corr.).

EXAMPLE 27

2-(2-Methylaminoethoxy)-10,11-dihydro-5H-dibenzo[a,d]cyclohepten-5-one [I; X is CH$_2$CH$_2$, Y is CH$_2$CH$_2$, Z is CO, N=B is NHCH$_3$]

2-[2-(N-Benzyl-N-methylamino)ethoxy]-10,11-dihydro-5H-dibenzo[a,d]cyclohepten-5-one (7.39 g. of the hydrochloride salt) (example 11) in 200 ml. of ethanol was hydrogenated at room temperature for 2½ hours in the presence of 0.74 g. of palladium-on-charcoal catalyst. The reaction mixture was filtered, the filtrate concentrated to dryness and the residue recrystallized from isopropyl alcohol to give 4.87 g. of 2-(2-methylaminoethoxy)-10,11-dihydro-5H-dibenzo[a,d]cyclohepten-5-one in the form of its hydrochloride salt, m.p. 183.8°–186.2° C. (corr.).

2-(2-Methylaminoethoxy)-10,11-dihydro-5H-dibenzo[a,d]cyclohepten-5-one was found to be 170 percent as active as imipramine in inhibiting phenylamine β-hydroxylase.

EXAMPLE 28 a. 2-[2-(N-Carbethoxy-N-methylamino)ethoxy]-5H-dibenzo[a,d]cyclohepten-5-one

A benzene solution of 2-[2-(N-benzyl-N-methylamino)ethoxy]-5H-dibenzo[a,d]cyclohepten-5-one (from 10.15 g. of its hydrochloride salt) (example 12) was treated with 3.0 ml. of ethyl chloroformate. The reaction mixture was allowed to stand overnight and then refluxed for 24 hours. The solvents were removed in vacuo and the residue dissolved in ether and treated with an excess of hydrogen chloride in ethanol. The solid product was filtered. The filtrate was concentrated and the residue was recrystallized from n-hexane to give 8.21 g. of 2-[2-(N-carbethoxy-N-methylamino)ethoxy]-5H-dibenzo[a,d]cyclohepten-5-one, m.p. 75°–76° C. (uncorr.); infrared absorption at 3.37, 5.92, 6.15, 6.25, 6.71 and 6.75–6.85 μ.

b. 2-(2-Methylaminoethoxy)-5H-dibenzo[a,d]cyclohepten-5-one [I; X is CH=CH, Y is CH$_2$CH$_2$, Z is CO, N=B is NHCH$_3$]

A mixture of 7.58 g. of 2-[2-(N-carbethoxy-N-methylamino)ethoxy]-5H-dibenzo[a,d]cyclohepten-5-one and 7.05 g. of potassium hydroxide in 75 ml. of ethanol was refluxed for 5½ hours. The reaction mixture was concentrated to less than half its volume, 250 ml. of water was added and the mixture extracted with ether. The ether extracts were washed with water and sodium chloride solution, dried over anhydrous magnesium sulfate and treated with an excess of hydrogen chloride in ethanol. The solid hydrochloride salt was recrystallized from isopropyl alcohol, converted to the free base and chromatographed on silica gel. The resulting material was recrystallized from n-hexane to give 2-(2-methylaminoethoxy)-5H-dibenzo[a,d]cyclohepten-5-one, m.p. 81.2°–84.0° C. (corr.). A sample of the hydrochloride salt when recrystallized from isopropyl alcohol had the m.p. 217.5°–221° C. (uncorr.).

EXAMPLE 29 a. 2-(2-Hydroxyethoxy)-10,11-dihydro-5H-dibenzo[a,d]cyclohepten-5-one

Ethylene oxide (2 ml.) was added to a solution of 6.73 g. of 2-hydroxy-10,11-dihydro-5H-dibenzo[a,d]cyclohepten-5-one and 2.45 g. of sodium hydroxide in 25–30 ml. of water held at 5° C. The reaction mixture was stirred at 0°–5° C. for 2 hours and then for 2 hours while allowing the solution to warm to room temperature. The mixture was stirred for 2 hours longer and acidified with hydrochloric acid. The solid material was separated, taken up in chloroform, and stirred and heated with excess sodium carbonate solution. The base insoluble material comprising 2-(2-hydroxyethoxy)-10,11-dihydro-5H-dibenzo[a,d]cycloheptene-5-one was isolated and used directly in the next reaction.

b. p-Toluenesulfonate ester of 2-(2-hydroxyethoxy)-10,11-dihydro-5H-dibenzo[a,d]cyclohepten-5-one The crude 2-(2-hydroxyethoxy)-10,11-dihydro-5H-dibenzo[a,d]cyclohepten-5-one from part (a) (5.04 g.) was dissolved in 25 ml. of pyridine. The solution was cooled to 4°–6° C. and 3.93 g. of p-toluenesulfonyl chloride in 5 ml. of pyridine was added over a period of 14 minutes. The reaction mixture was stirred at 5°–10° C. for 2½ hours, allowed to stand overnight and then stirred at 20°–25° C. for 2½ hours. The reaction mixture was added to ice-water containing 80 ml. of concentrated hydrochloric acid and extracted with benzene. The benzene extracts were washed with water and sodium chloride solution, dried over anhydrous magnesium sulfate and concentrated. The residual 6.25 g. of oil comprising p-toluenesulfonate ester of 2-(2-hydroxyethoxy)-10,11-dihydro-5H-dibenzo[a,d]cyclohepten-5-one was used directly in the next reaction.

c. 2-(2-Ethylaminoethoxy)-10,11-dihydro-5H-dibenzo[a,d]cyclohepten-5-one [I; X is CH$_2$CH$_2$, Y is CH$_2$CH$_2$, Z is CO, N=B is NHC$_2$H$_5$]

A mixture of 5.25 g. of the p-toluenesulfonate ester of 2-(2-hydroxyethoxy)-10,11-dihydro-5H-dibenzo[a,d]cyclohepten-5-one, 4 ml. of anhydrous ethylamine and 50 ml. of toluene was stirred with cooling for 2 hours, allowed to stand overnight at room temperature and then stirred with gentle reflux for 8 hours. The product was isolated, dissolved in ether and treated with an excess of hydrogen chloride in ethanol. The resulting product was recrystallized from isopropyl alcohol to give 2-(2-ethylaminoethoxy)-10,11-dihydro-5H-dibenzo[a,d]cyclohepten-5-one in the form of its hydrochloride salt, m.p. 186.0°-191.0° C. (corr.).

By replacing the ethylamine in the foregoing procedure by a molar equivalent amount of ammonia, cyclohexylamine, cyclopentylamine, 4-methylcyclohexylamine or 2-phenylethylamine, there can be obtained, respectively, 2-(2-aminoethoxy)-10,11-dihydro-5H-dibenzo[a,d]cyclohepten-5-one, 2-(2-cyclohexylaminoethoxy)-10,11-dihydro-5H-dibenzo[a,d]cyclohepten-5-one, 2-(2-cyclopentylaminoethoxy)-10,11-dihydro-5H-dibenzo[a,d]cyclohepten-5-one, 2-[2-(4-methylcyclohexylamino)ethoxy]-10,11-dihydro-5H-dibenzo[a,d]cyclohepten-5-one, or 2-[2-(2-phenylethylamino)ethoxy]-10,11-dihydro-5H-dibenzo[a,d]cyclohepten-5-one.

We claim:
1. A compound of the formula

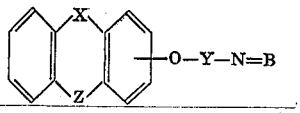

wherein:
—N=B is a member of the group consisting of amino, lower-alkylamino, cycloalkylamino, (phenyl-lower-alkyl)amino, di-lower-alkylamino, dicycloalkylamino, N-(cycloalkyl)-lower-alkylamino, polymethylenimino of 5-7 ring members, 4-morpholinyl, 1-piperazinyl, 4-lower-alkyl-1-piperazinyl, 4-phenyl-1-piperazinyl, di-(phenyl-lower-alkyl)amino, and N-(phenyl-lower-alkyl)-lower-alkylamino, cycloalkyl in each instance having from five to six ring members;

X is a member of the group consisting of —$CH_2CH_2$— and —CH=CH—;

Y is a lower-alkylene bridge having its connecting valences on different carbon atoms; and Z is a member of the group consisting of $CH_2$, CH(lower-alkyl) and CH(phenyl-lower-alkyl).

2. A compound according to claim 1 wherein —N=B is di-lower-alkylamino.

3. 2-(2-Dimethylaminoethoxy)-10,11-dihydro-5H-dibenzo[a,d]cycloheptene, according to claim 1.

4. 2-(2-Dimethylaminoethoxy)-10,11-dihydro-5-methyl-5H-dibenzo[a,d]cycloheptene, according to claim 1.

* * * * *